United States Patent

[11] 3,625,223

| [72] | Inventor | Robert E. Shuler |
| | | Hoopeston, Ill. |
| [21] | Appl. No. | 79,158 |
| [22] | Filed | Oct. 8, 1970 |
| [45] | Patented | Dec. 7, 1971 |
| [73] | Assignee | FMC Corporation |
| | | San Jose, Calif. |

[54] SELF-CLEARING CORN CUTTERHEAD
5 Claims, 5 Drawing Figs.

| [52] | U.S. Cl. | 130/9 |
| [51] | Int. Cl. | A01f 11/06 |
| [50] | Field of Search | 130/6, 9 B |

[56] References Cited
UNITED STATES PATENTS

| 2,386,955 | 10/1945 | Kerr | 130/9 |
| 2,577,530 | 12/1951 | Kerr | 130/9 |
| 2,787,273 | 4/1957 | Kerr | 130/9 |
| 3,295,532 | 1/1967 | Childers | 130/9 |

Primary Examiner—Antonio F. Guida
Attorneys—F. W. Anderson and C. E. Tripp

ABSTRACT: A rotary corn cutterhead has a housing, an annular cutterhead gear, a knife anchor assembly rotatable in the housing and forming a conical entrance throat that rotates. Radial knives are formed on the assembly and project into the entrance throat. A fixed conical deflector overlies the axially outer portion of the entrance throat to serve as a gravity delivery chute for the kernels, whereas the axially inner portion of the throat presents a rotating conical surface to the knives and hence is self-cleaning. A radial scraper is mounted on the fixed conical deflector and overlies the rotating conical surface of the entrance throat.

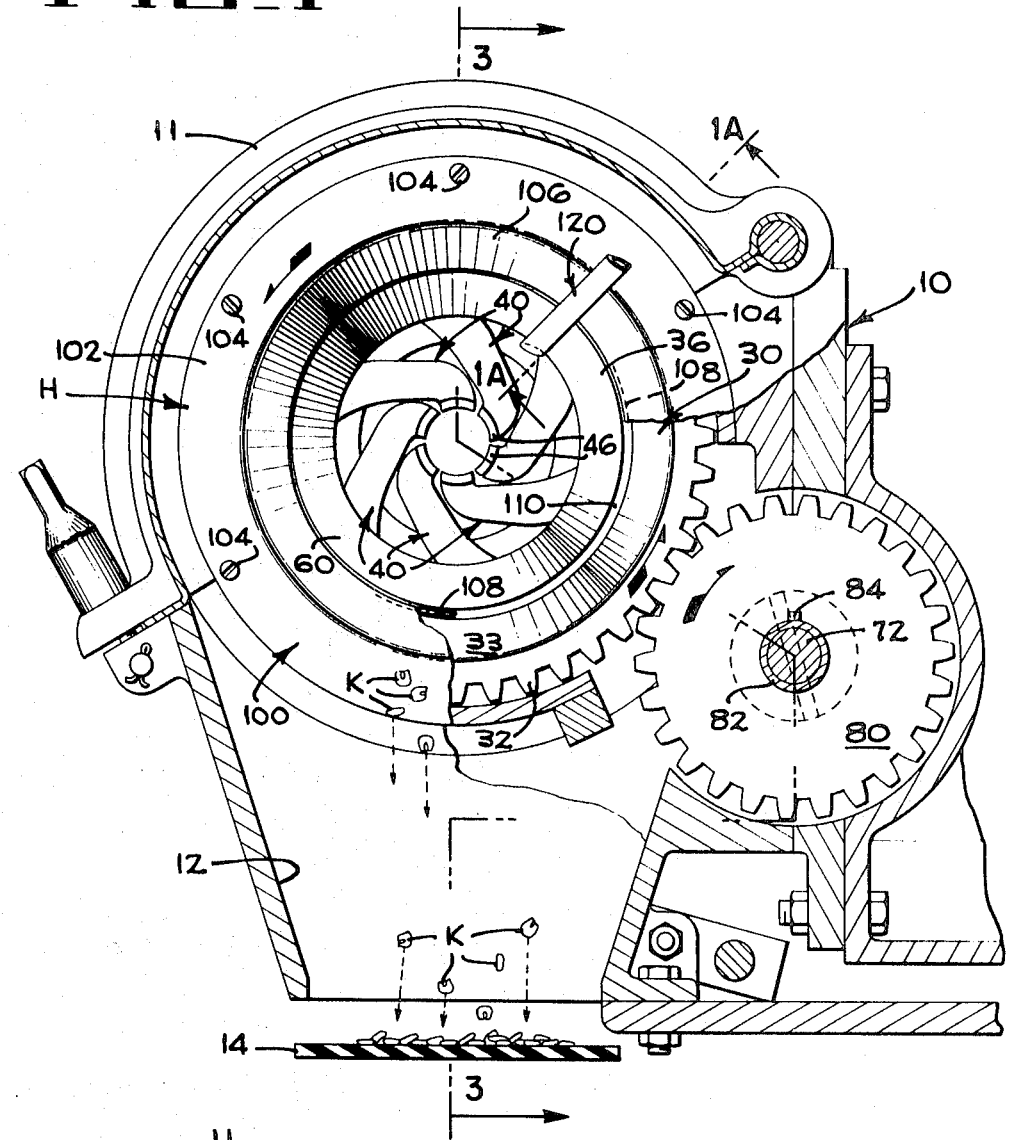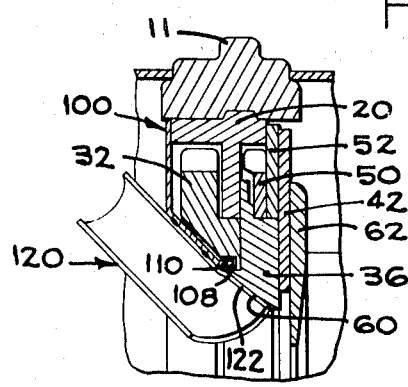

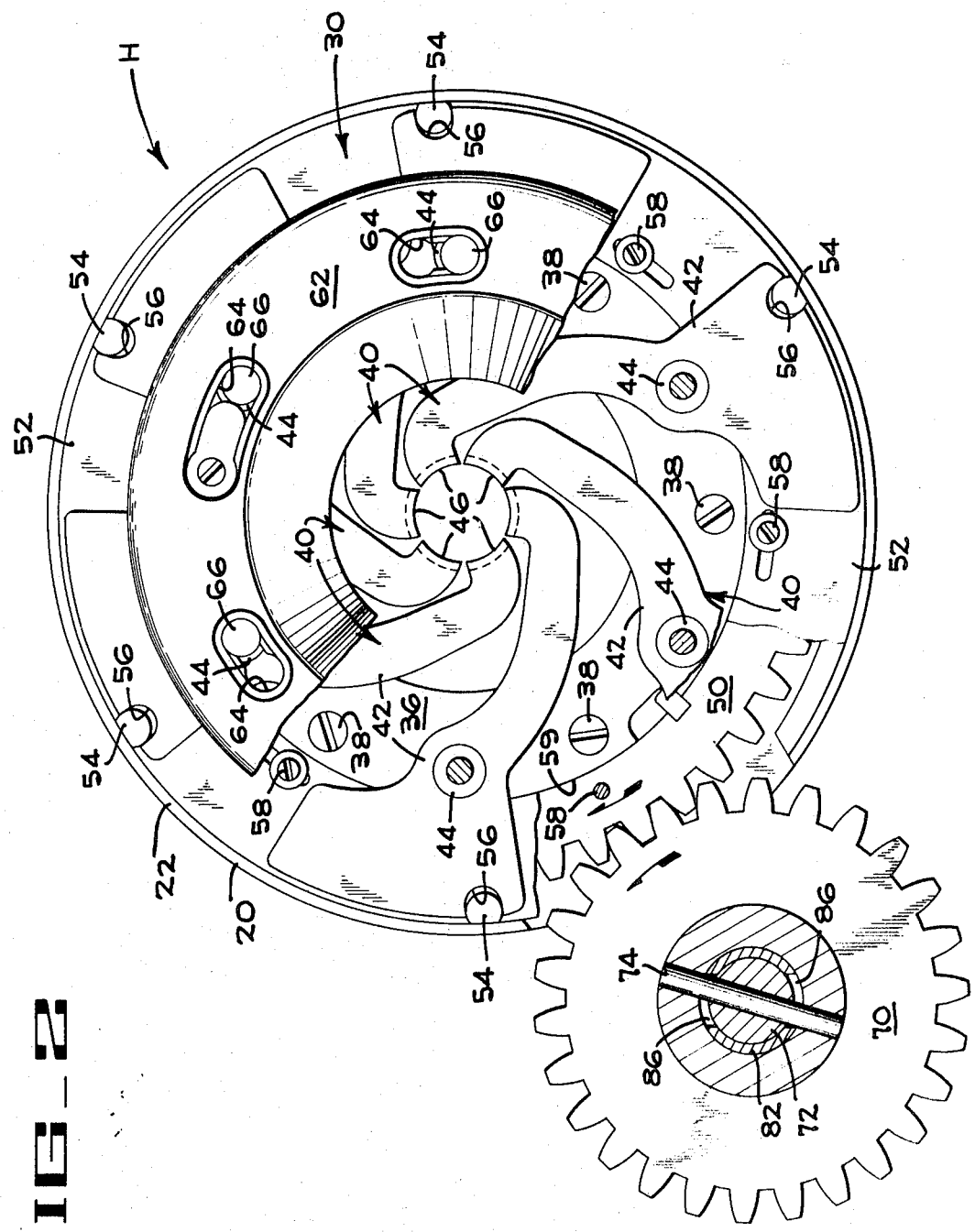

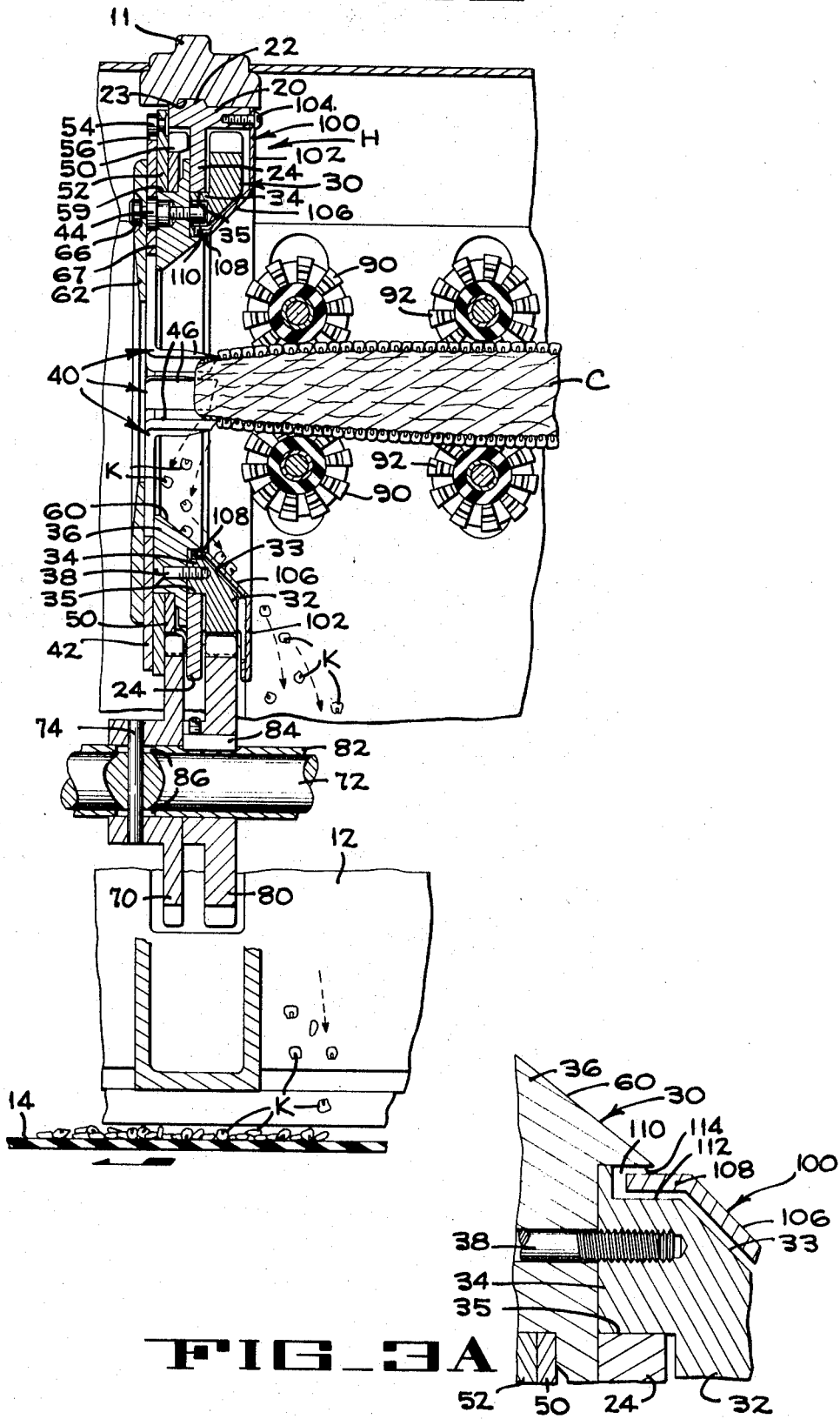

SELF-CLEARING CORN CUTTERHEAD

FIELD OF THE INVENTION

This invention relates to rotating corn cutting apparatus and more particularly the apparatus of a type that provides an annular entrance throat into which project cutting blades that receive the ears of the corn and slice off the kernels for collection.

DESCRIPTION OF PRIOR ART

The most pertinent prior art known to applicant is represented by the United States patent to Kerr U.S. Pat. No. 2,787,273, issued Apr. 2, 1957 and assigned to the FMC Corporation. Similar corn cutters appear in the United States patents to Kerr U.S. Pat Nos. 2,386,955, issued Oct. 16, 1945; Kerr U.S. Pat No. 2,577,530, issued Dec. 4, 1951; and Childers U.S. Pat No. 3,295,532, issued Jan. 3, 1967; also assigned to the FMC Corporation.

In the Kerr U.S. Pat. No. 2,787,273, a cutter drive gear (FIG. 6) is rotatably mounted within the housing of the cutterhead and forms an assembly with an anchor plate that pivotally mounts the cutter knives. This knife assembly is rotated by external gears and has a rotating conical annular entrance throat to accommodate the reduction of the corn. The entire conical entrance throat is shielded by a plate mounted on the cutter housing which plate has a conical deflector portion overlying the rotating drive gear and knife anchor plate assembly. As will be seen, the cutterhead mechanism of the present invention is substantially like that of the aforesaid Kerr patent, the improvement lying in the construction of the fixed shield and conical deflector.

SUMMARY OF THE INVENTION

As mentioned, the corn cutterhead of the present invention represents an improvement over that of the above-cited patents. In accordance with the present invention, the conical deflector portion of the shield surrounds the outer, cutterhead drive gear but does not overlie the inner, knife anchor plate assembly. This leaves exposed, a rotating inner conical throat portion of the cutterhead and thus presents a rotating surface to kernels or corn that fly radially outwardly from the ears of corn during the cutting operation. The axial inner throat portion (which now has an exposed rotating surface) is the smallest diameter portion of the entrance throat and formerly accumulated bodies of kernels which stuck to the throat, thereby presenting a cleaning problem. Also, accumulations of kernels would sometimes fall on the ears of corn being cut in a manner in which they were trapped between the ears and the feed rollers and would be crushed. The axially outer, larger diameter portion of the conical throat serves as a delivery chute for the kernels and hence functions best as a stationary member. Thus by forming the conical entrance throat into an inner, rotating section and an outer, fixed section the advantages of a self-cleaning action are attained while retaining the effective delivery action of the prior devices.

In addition to being self-cleaning, the rotating conical third portion is provided with guides or deflectors that channel cut kernels from the self-cleaning throat out of the apparatus and prevent the kernels from falling on the incoming ears to be crushed between the ears and the feed rollers.

Another feature of the present invention is that the diameter of the entrance throat has been increased somewhat over that of the prior machines which further facilitates the self-cleaning characteristics of the cutting head of the present invention.

BRIEF DESCRIPTION OF THE DRAWINGS

FIG. 1 is a front elevation of a corn cutterhead assembly of the present invention, with parts broken away.

FIG. 1A is a section taken on 1A—1A of FIG. 1.

FIG. 2 is a rear elevation of the cutting head assembly, the main machine housing being omitted in this view.

FIG. 3 is a section of the cutting head taken on line 3—3 of FIG. 1 and also showing the positions of the feed rollers for the incoming ears of corn.

FIG. 3A is a fragmentary enlarged section through the shield portion of the head.

DETAILED DESCRIPTION

The corn cutting head of the present invention is illustrated and described as installed in a corn cutting machine such as that shown in the United States patent to Kerr U.S. Pat. No. 2,787,273. It will be obvious that the head can also be installed in the improved Kerr-type apparatus shown in the aforementioned United States patent to Childers U.S. Pat. No. 3,295,532 issued Jan. 3, 1967. In order to provide a proper background for the invention, the salient features of the head and the apparatus will first be described including portions of the head which are known from the above-mentioned patents. However, in order to more distinctly point out the improvement represented by the present invention all of the details of the housing for the apparatus, the drives for the head, the feeding mechanism for the ears of corn, trimmed by the cutting knives of the head, etc. will not be described, it being understood that apparatus suitable for such purpose is likewise disclosed in the aforementioned patents.

A corn cutterhead H embodying the present invention is mounted in an outer or main housing or framework 10 by means of a clamp 11, and the housing is provided at its lower portion with a discharge chute 12 formed in the head supporting standard. The kernels K, cut from the ears by the head, fall by gravity from the conical entrance throat of the head H and down through the chute 12 formed in the head supporting standard. The kernels K, cut from the ears by the head, fall by gravity from the conical entrance throat of the head H and down through the chute 12. The kernels fall onto a take-away conveyor below the apparatus, such as the belt conveyor illustrated diagrammatically at 14 (see also FIG. 3).

The corn cutterhead H is made detachable from the main housing 10 (FIG. 1) by the housing clamp 11 and includes its own annular housing 20 (FIG. 3) having a circumferential locating rib 22 that is received in a mating groove 23 in the outer housing and assists in holding the removably mounted head in the main frame of the apparatus, all as disclosed in the aforesaid patents such as in FIG. 2 of Kerr U.S. Pat. No. 2,787,273.

Depending from the annular inner housing 20 is a radial locating flange 24 that serves as a guide for a rotatable knife guide gear and knife anchor assembly indicated generally at 30. The assembly 30 includes a cutterhead drive gear 32 having peripheral teeth and formed with a conical entrance throat 33 (FIGS. 3 and 3A). Projecting axially inwardly from the gear 32 is an axial locating and guide flange 34, that rotates in the inner surface 35 of the housing flange 24, thus providing a radial locating bearing surface for the assembly 10.

The assembly 30 also includes a knife anchor plate 36 secured to the drive gear 32 by screws 38 at the lower portions of FIG. 3.

The corn cutting knives are indicated generally at 40 and their shape can be seen best in FIG. 2. As seen in FIGS. 2 and 3, the knives 40 have radial mounting and operating arms 42 which are pivoted on the knife anchor plate 36 by means of pivot pins 44. The radially inner portions of the radial knife arms 42 are bent axially outwardly to form corn cutting blades 46. These project into the central portion of the entrance throat of the head.

Although the details of the knife adjustment feature illustrated are not critical to the present invention, a knife adjustment construction is incorporated in the head like that disclosed in the aforementioned Kerr and Childers patents, to which reference is made for a more complete description of the operation of the adjustment. As explained in the aforesaid patents, the knife adjusting gear 50 can be rotated to a limited circumferential extent relative to the knife drive gear 32 in order to adjust the effective cutting diameter of the axial blade portions 46 of the cutting knives 40. In order to perform this adjustment, (which can be performed externally as described in the above-mentioned patents) a knife adjusting ring 52 has a series of peripheral pins 54 (FIGS. 2 and 3) which fit into outwardly opening slots 56 formed in the periphery of each radial knife arm 42. The knife-adjusting ring 52 is secured at a selected circumferential position to the adjusting gear 50 by clamp screws 58 that extend through circumferential slots in the ring 52 and are threaded into the gear. The knife-adjusting gear 50 and the adjusting ring 52 are both radially guided during their rotational movement relative to the assembly 30 by an axial bearing ledge 59 formed on the anchor plate 36 (FIG. 3).

The knife anchor plate 36 is formed with a conical entrance throat portion 60 (FIG. 3) that is somewhat of a continuation of the conical portion 33 formed on the knife drive gear 32. The knives 40 are held in place against the knife-adjusting ring 52 by means of an annular keeper plate 62 having bayonet mounting slots 64 (FIG. 2) that cooperate with headed pin extensions 66 (FIG. 3) integral with the knife pivot pins 44 previously described.

The keeper plate 62 holds the radial knife arms 42 against the axially inner face 67 of the anchor plate 36 and the knife arms 42 axially retain the knife-adjusting ring 52 and the knife-adjusting gear 50 on the ledge 59, as shown in FIG. 3.

As mentioned, the manner in which the cutterhead drive gear 32 and the knife-adjusting gear 50 are simultaneously driven are not critical to the present invention and apparatus of the type shown in the aforementioned Kerr and Childers patents is partially illustrated in the drawings. Such apparatus is illustrated in FIGS. 1 and 3 and includes a drive gear 70 meshed with the knife-adjusting gear 50. The gear 70 is pinned to a freely rotating shaft 72 by a radial pin 74 in the hub of the gear.

Aligned with the knife-adjusting drive gear 70 is a drive gear 80 for the cutterhead gear 50. The gear 80 is keyed to a tubular drive shaft 82 by a key 84 and the tubular shaft has slots 86 for permitting limited relative displacement of the gears 70 and 80 for adjusting the knife circle in accordance with the diameter of the ears of corn fed to the machine, as described in the patents to Kerr and Childers previously mentioned. In normal cutting operation, the gears 70 and 80 rotate together thereby rotating the cutting head H for stripping kernels from ears of corn.

In order to feed the ears of corn to the axial cutters 46, pairs of feed rolls 90 and 92 (FIG. 3) are provided in accordance with previously mentioned patents, it being understood that the feed details are likewise not critical to the present invention and the feeder systems shown in those patents can be employed.

Most of the structure thus far described can be considered to be known in the prior art with the exception of the offset entrance throat structure 33, 60 of the cutterhead. The improved entrance throat forming the subject matter of the present invention will now be described in detail.

As can be seen in FIG. 6 of the previously mentioned Kerr patent and in FIG. 5 of the Childers patent, the prior cutterheads (over which the present head is an improvement) are provided with a fixed shield that partially corresponds to a shield 100 of the present invention. The prior shields and that of the present invention have a radial mounting flange secured to the inner housing of the cutterhead and both have a conical deflector at the entrance throat. However, the conical deflector portion of the shield 100 of the present device only overlies that portion of the conical entrance throat formed by the cutter drive gear 32, and the conical entrance throat (portion 60) formed by the knife anchor plate 36 is exposed. In other words, the shields prior to that of the present invention embodied a conical deflector that formed the entire entrance throat. Since these deflectors were fixed, and since the knives are rotating, kernels of corn cut from the knives were thrown against the deflector, and particularly against the axially inner portion of the deflector that overlies the knives. It was found that these kernels (being soft and moist) would stick to and build up on the fixed deflector thereby creating a cleaning problem, sanitation being an important aspect of all food-processing equipment.

As mentioned above, in accordance with the present invention, the sanitation problems presented by the prior cutting heads are largely solved in a simple manner, by stopping the fixed conical deflector 106 (FIG. 3) short of the conical entrance throat 60 provided by the knife anchor plate 36. In the specific construction shown, the annular shield 100 has a radial flange 102 secured by screws 104 to the periphery of the inner housing 20, and merging with the conical deflector portion 106 that overlies the conical entrance throat 33 of the cutter drive gear 32. Since the conical deflector 106 stops short of the conical entrance throat 60 formed in the knife anchor plate 36, means are provided to prevent trapping of corn at this relatively rotating junction of parts. Thus, a short axial flange 108 terminates the conical entrance deflector portion 106 and projects into a groove 110 formed in the assembly 30. The groove 110, as best seen in the enlarged section of FIG. 3A, is formed by machining a recess 112 at the inner periphery of the drive gear 32 which recesses surrounds a ledge 114 machined at the outer portion of the entrance throat 60 formed in the knife anchor plate 36. The flange 108 makes a relatively close fit in the groove 110 and thereby prevents kernels of corn from being trapped in and mashed at this relatively rotating junction of parts.

In order to clear the rotating throat surface 60 of adhering kernels, a radial scraper 120 (FIGS. 1 and 1A) is welded to an upper portion of the fixed shield 100. The scraper 120 is in the form of an arcuate blade having a projecting lip 122 that closely overlies the rotating throat surface 60 and hence removes kernels adhering to that surface.

In operation, ears of corn C are fed by the feed rollers 90,92 to the rapidly rotating cutter blades 46. The kernels of corn K are detached from the blades, drop out through the conical entrance throat and down through the support of the apparatus (FIG. 1) to the conveyor belt 14. However, in zones of the entrance throat surrounding the blades 46, the kernels are flung radially outwardly with some force and impinge on the entrance throat. However, in the construction of the present invention that zone of the entrance throat is formed by the exposed and rotating conical portion 60 of the knife anchor place 36. With this construction, the radially flung kernels of corn ricochet clear of the conical entrance portion 60 and drop out along with the kernels, through the fixed conical deflector 106 of the shield 100. The scraper 120 removes adhering kernels from the rotating throat 60. The deflector 106 is not rotating and has a larger radius than that of the exposed conical throat 60, so that the mashing effect of any kernels that are centrifugally directed to the fixed shield is small. Likewise, the fixed shield does not surround the active part of the cutting knives 46. The advantage of having a fixed conical deflector 106 is that this portion of the deflector serves to deliver the kernels K out of the head by gravity and if this portion were also rotating, then the kernels would be flung about the machine rather than falling in an orderly fashion down onto the conveyor 14. Thus, although the division of an entrance throat into an exposed rotary portion and a fixed deflector portion is a simple modification of the prior cutting heads, this modification retains the undisturbed delivery advantages of the prior deflector as well as adding a self-cleaning feature unobtainable with those deflectors.

Although the best mode contemplated for carrying out the present invention has been herein shown and described, it will be apparent that modification and variation may be made without departing from what is regarded to be the subject matter of the invention.

What I claim is:

1. In a rotary corn cutterhead of the type having a housing, an annular cutterhead gear and knife anchor assembly rotatable in said housing, a conical corn entrance throat formed in said assembly, knives mounted on said assembly, and projecting axially into said entrance throat, and a fixed annular shield attached at its periphery to said housing and having a conical deflector overlying said entrance throat; the improvement wherein said fixed deflector overlies only the axially outer portion of said entrance throat for undisturbed gravity delivery of kernels, leaving the axially inner conical portion of the throat exposed to the removed kernels of corn for producing a rotating, self-cleaning, conical entrance throat section that surrounds the rotating knives.

2. The cutterhead of claim 1, wherein an annular groove is formed at the inner periphery of said conical deflector, and a short axial flange projecting axially inwardly from said deflector and into said groove.

3. The cutterhead of claim 2, wherein said gear and knife anchor assembly comprises separate gear and knife anchor parts joined at an axially intermediate portion of the cutterhead; said annular groove being formed by a recess in the gear part of said assembly that overlies an axial ledge on the knife part of the assembly.

4. The cutterhead of claim 1, comprising a fixed scraper overlying said rotating entrance throat section.

5. The cutterhead of claim 4, wherein said scraper is generally radial and is secured to the conical deflector of said fixed annular shield.

* * * * *

PO-1050
(5/69)

UNITED STATES PATENT OFFICE
CERTIFICATE OF CORRECTION

Patent No. 3,625,223          Dated December 7, 1971

Inventor(s)      ROBERT E. SHULER

It is certified that error appears in the above-identified patent and that said Letters Patent are hereby corrected as shown below:

Column 2, lines 33-34-35 and 36; after "12" insert a period and delete "formed in the head supporting standard. The kernals K, cut from the ears by the head, fall by gravity from the conical entrance throat of the head H and down through the chute 12."

Signed and sealed this 11th day of July 1972.

(SEAL)
Attest:

EDWARD M.FLETCHER,JR.      ROBERT GOTTSCHALK
Attesting Officer             Commissioner of Patents